Dec. 21, 1965 J. F. HAUBER 3,225,303
MODULATING AND DEMODULATING APPARATUS
Filed May 31, 1962

INVENTOR.
JOSEPH F. HAUBER
BY Roger W. Jensen
ATTORNEY.

United States Patent Office 3,225,303
Patented Dec. 21, 1965

3,225,303
MODULATING AND DEMODULATING APPARATUS

Joseph F. Hauber, Minneapolis, Minn., assignor to Honeywell Inc., a corporation of Delaware Filed May 31, 1962, Ser. No. 198,793
7 Claims. (Cl. 329—102)

This invention pertains generally to demodulators, and more specifically to a new and novel demodulator in which a bias output voltage is obtained in the absence of an input signal and wherein the output signal varies in accordance with the input signal from said bias voltage.

In its simplest form, the invention involves using a switch which opens in synchronism with an applied input signal and utilizes a reference signal or bias voltage. The input signal, the bias voltage, and the switch, are connected in series. The signal obtained from this combination is applied through a filtering network and an output direct voltage signal is obtained which is of a predetermined value in the absence of an input signal and is indicative of the bias voltage and which varies in accordance with the input signal from the predetermined value established by said bias voltage.

As is the usual case with demodulators, the circuitry of this invention can be reversed to provide a modulator which provides an output signal without an input signal and the output signal can be modulated in accordance with the input signal to vary from the reference or bias output signal.

It an object of this invention to provide a new and novel demodulator wherein a bias output voltage may be obtained using a small number of inexpensive components.

Another object of this invention is to provide a modulator wherein an offset output signal is obtained in static conditions.

A further object of this invention is to provide a demodulator which can be very economically built, and which occupies a minimum of space.

Further objects of this invention will become clear upon reference to the specification and appended claims in conjunction with the drawings in which:

Figure 1:
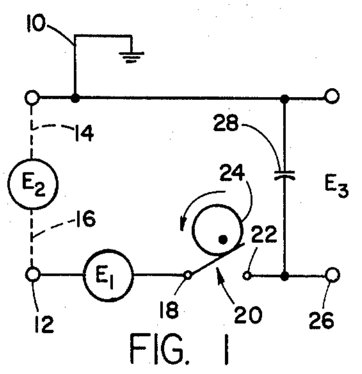
FIGURE 1 is a simple representation of the invention.

In FIGURE 1, reference numeral 10 represents ground or reference potential. A terminal 12 represents an input terminal when the apparatus is being used as a demoduator and represents an output terminal when the apparatus is being used as a modulator. A voltage source $E_2$ is shown connected between ground 10 and junction point 12 by dashed leads 14 and 16 to show that the signal obtained from $E_2$ is applied to the terminals when the circuit is being used as a demodulator whereas a different signal $E_2$ is obtained when the circuit is used as a modulator. A second voltage or signal source $E_1$ is connected between terminal 12 and a junction point 18. A switch generally designated as 20 is connected between the junction point 18 and a normally open contact 22. The switch means 20 in this representation is closed by an offset cam 24 which is adapted to connect junction point 18 to contact 22 for predetermined intervals of time on each revolution of the cam 24 which is powered by motor means not shown. Contact 22 is connected to a terminal or output means 26. A capacitive means 28 is connected between ground potential 10 and the output terminal 26. $E_3$ represents a voltage obtained between reference potential and terminal 26 when the circuit is used as a demodulator and also represents a signal which is applied between these two points when the circuit is used as a modulator.

Figure 2:
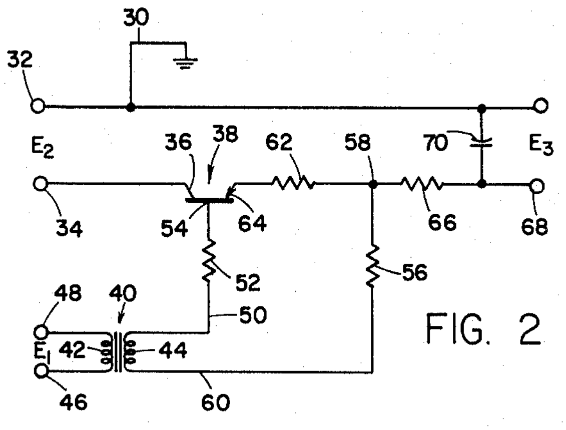
FIGURE 2 is a circuit diagram of one embodiment of a completely electronic form of the invention.

In FIGURE 2 ground or reference potential is represented as 30 and is connected to a first input terminal 32. A second input terminal 34 is connected to a collector 36 of a PNP transistor, electric valve means or switching means generally designated as 38. A transformer generally designated as 40 has a primary winding 42 and a secondary winding 44. The ends of the primary winding 42 are connected to junction points or terminals 46 and 48 which for operation of the circuit are connected to a voltage source $E_1$. One end 50 of the secondary winding 44 of transformer 40 is connected to one end of an impedance or resistance means 52 which is connected at its other end to a base 54 of transistor 38. A second resistance or impedance means 56 is connected between a junction point 58 and the other end 60 of secondary winding 44. A third impedance means or resistance means 62 is connected between the junction point 58 and an emitter 64 of the transistor 38. A fourth resistance or impedance means 66 is connected between the junction point 58 and an output terminal 68. A capacitive element, reactive means or filter means 70, is connected between ground 30 and output terminal 68. A signal or potential $E_2$ is shown between terminals 32 and 34 and represents an input signal being supplied to the circuit when the circuit is used as a demodulator and represents an output signal which may be different from the input signal when the circuit is used as a modulator. A signal represented as $E_3$ is shown between ground 30 and output terminal 68 which is the output signal when the circuit is used as a demodulator and is the input signal being applied to these two terminals when the circuit is used as a modulator.

Figure 3:
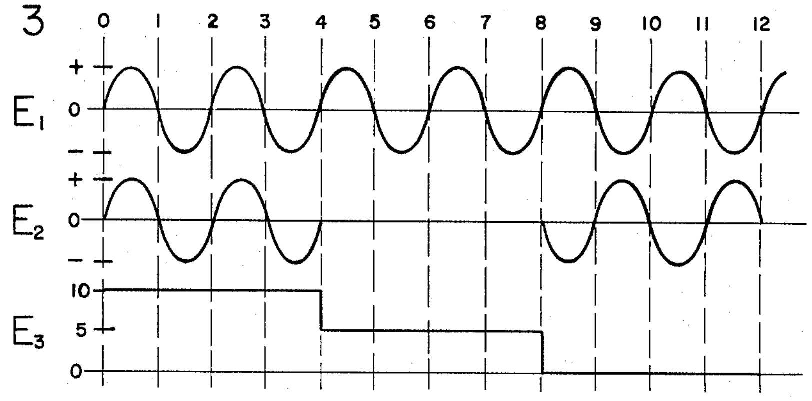
FIGURE 3 is a representation of wave forms to be found at various points in FIGURES 1 and 2 when the circuits are used as demodulators.

FIGURE 3 is a representation of the wave forms of the three aforementioned signals $E_1$, $E_2$, and $E_3$. The waveforms are broken up into 12 time segments. Each time segment represents one-half cycle or 180 electrical degrees of variation in the reference signal $E_1$. The time from 0 to 4 represents one input condition wherein an input signal $E_2$ is presented which is a maximum amplitude and of a first phase. The time from 4 to 8 represents a period wherein the input signal $E_2$ is completely absent. The time from 8 to 12 represents an input signal of an opposite phase and of full amplitude as compared to the input signal in the time from 0 to 4. In general, FIGURE 3 represents the signals which are supplied to and obtained from FIGURE 2 when used as a demodulator, and also apply generally to FIGURE 1.

Figure 4:
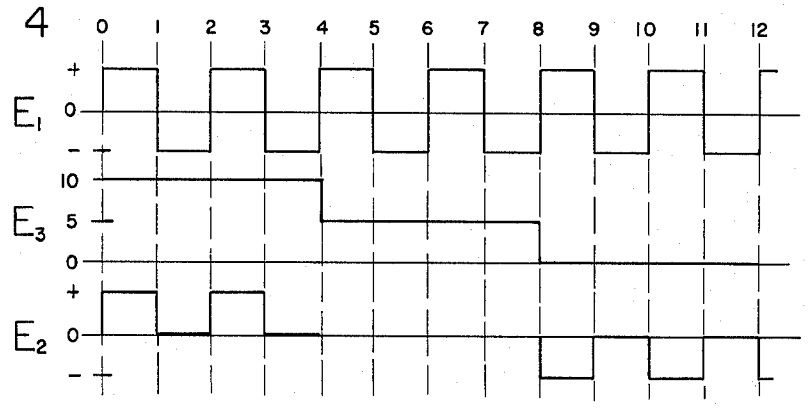
FIGURE 4 is a representation of the wave forms to be found in FIGURES 1 and 2 when the circuits are used as modulators.

FIGURE 4 is drawn on the same basis as is FIGURE 3 in that signals $E_1$, $E_2$, and $E_3$ are from the same points in the circuit of FIGURE 2. However, FIGURE 4 is drawn using square wave signals as probably would be used and obtained when FIGURE 2 or FIGURE 1 is used as a modulator. It is possible, however, to use any waveform which will provide the result desired. In FIGURE 4, $E_1$ represents the reference signal while $E_3$ represents an input signal which is a direct voltage signal in the case of a modulator. $E_2$ represents an output signal which is a pulsating direct voltage which is modulated from being a pulsating direct voltage of one polarity with respect to ground and to pulsating direct voltage of the opposite polarity with respect to ground.

*Operation*

For simplicity of explanation, FIGURE 1 will be explained first. It may be assumed that a signal of the wave form shown in FIGURE 3 as $E_1$ is applied to the point represented as $E_1$ in FIGURE 1, and a signal $E_2$ is applied between ground 10 and terminal 12 as shown in FIGURE 1. If it further be assumed that the cam 24 operates to close the switch 20 on each positive half cycle of $E_1$, ideally the output $E_3$ will be obtained. Wave form $E_1$ is the wave form indicating the voltage at terminal 18 with respect to terminal 12 and wave form $E_2$ is the voltage at terminal 12 with respect to ground 10. If the switch 20 closes each positive half cycle of $E_1$, as an example during the time from 0 to 1, the voltages will add so that the total voltage applied across capacitor 28 will equal the sum of the peak voltages of $E_1$ and $E_2$ and the result will be the voltage $E_3$. If the capacitor 28 does not discharge too rapidly, it will hold a voltage across it as the amplitudes of the voltages or signals $E_1$ and $E_2$ decrease in amplitude. It will be noted that to obtain the output shown, a good filter needs to be inserted between junction point 22 and output 26 and ground 10. During the negative half cycles of the signals $E_1$ and $E_2$, the switch 20 will open and the capacitor 28 will not be able to discharge. On each succeeding positive half cycle of signal $E_1$ the capacitor 28 will charge up to the peak summation voltages and will continue to provide an output as shown between the time 0 and 4 for the signal $E_3$. If the signal $E_2$ starts decreasing in amplitude but remains of the same phase, the output signal $E_3$ will be reduced accordingly. When the signal $E_2$ is reduced to zero amplitude, the capacitor 28 will still charge to a value near the peak voltage of the reference or biasing signal $E_1$. Thus, an output signal is obtained such as shown for signal $E_3$ between the time periods 4 and 8. If the signal $E_2$ is now applied between ground 10 and terminal 12 such as shown between time periods 8 and 12 in FIGURE 3, it will be noted that when signals $E_1$ and $E_2$ are added using the same references noted above, the total voltage from ground 10 to junction point 18 will result to a value of zero. If $E_2$ is of an amplitude less than the amplitude of $E_1$ but of the same phase as shown for $E_2$ between the time periods of 8 and 12, a signal will be obtained somewhere between the value shown for no input signal and the full signal shown between the time periods 8 and 12. In explaining the simple representation of FIGURE 1, it must be realized that if a circuit such as shown by FIGURE 1 is actually used, some means to prevent discharge to the capacitor 28 has to be used to obtain a smooth output wave form such as shown by $E_3$ in FIGURE 3. As FIGURE 1 is presently drawn, the output signal is a pulsating direct voltage of the half wave rectified type. If however, a diode is inserted between the voltage source $E_1$ and junction point 18, the capacitor 28 will not be able to discharge back through the voltage sources and will only be able to discharge through a load connected between the ouput terminal 26 and ground 10. In this event, the capacitor 28 will stay charged to the peak value of voltages being supplied subject only to discharge through any load which may be imposed on the output of the circuit.

FIGURE 2, which is a completely electronic and a somewhat more complex version of FIGURE 1, will provide an output closer to the ideal representations of FIGURE 3. The signal $E_1$ when applied to the primary 42 of transformer 40, switches transistor 38 to an ON condition for one-half of every full cycle. During the time that the transistor 38 is switched to an ON condition, current flows from lead 60 through resistor 56, resistor 62, emitter 64, base 54, resistor 52, and back to transformer 40 through lead 50. A voltage drop is obtained across resistor 62 which supplies a voltage or signal equivalent to that provided by source $E_1$ in FIGURE 1. The transistor 38 supplies the same function as switch 20 in FIGURE 1. The transistor 38 will only turn to an ON condition when lead 60 is positive with respect to lead 50 of transformer 40. When a signal is applied between terminals 32 and 34 such as that shown between times 0 and 4 for signal $E_2$, an output signal such as $E_3$ will be obtained between ground 30 and terminal 68. Resistance 66 in combination with capacitor 70 provides a filtering network and an output signal is thereby obtained which is more nearly that shown as the ideal wave form $E_3$. This result is obtained because the capacitor 70 cannot discharge quickly through the impedance means 66. As was explained for FIGURE 1, an output signal will be obtained in the absence of the input signal $E_2$ as shown between times 4 and 8 in FIGURE 3. During this time, terminal 34 is effectively connected to ground terminal 30 if voltage source $E_2$ is of a low impedance and therefore the output signal $E_3$ will be of some value representative of the peak voltage dropped across resistor 62.

It will be realized that there is also an error producing voltage drop present between emitter 64 and collector 36 and this voltage drop must be taken into consideration when designing the circuit. If high quality, low saturation resistance transistors are used, the error produced by this voltage drop will be quite small. A so called "symmetrical transistor" was used in this application since approximately the same base to emitter rating is required of the transistor 38 as its base to collector voltage rating. This type transistors have similar saturation resistances $R_{CS}$ and D.C. current gains $h_{FE}$ in the normal and reversed collector current configurations. During the half cycle that transistor 38 is in an OFF condition, the voltage between base 54 and collector 36 can be as much as the absolute sum of the peak voltages $E_1$ and $E_2$ and $E_3$. The base 54 can be at least as positive with respect to emitter 64 as the peak value of voltage $E_1$ is with respect to emitter 64. Some standard type transistors will not take this great voltage rating without being damaged. However, it is within the contemplation of this invention to use any mechanical or electronic switch or any transistor or electric valve means which will perform the functions indicated.

If FIGURE 1 is to be used as a modulator, the wave forms of FIGURE 4 are applicable. If FIGURE 1 is used as a modulator, it is normally desirable to use a square wave voltage for source $E_1$. A sine wave can be used for voltage source $E_1$ but the output obtained will have a very poor wave form as compared to a sinusoid. Again, the switch 20 is operated at a frequency such that it is closed on each successive half cycle of the signal $E_1$. If an input signal $E_3$ is applied, which is a positive valuve such as the relative value of 10 volts shown between times 0 and 4 in FIGURE 4, an output signal such as $E_2$ will be obtained which is the summation of the signal $E_3$ and $E_1$. Since the polarity of $E_1$ is in opposition to input voltage $E_3$, the output voltage or signal will be less than the full amplitude of the signal $E_3$. During the period of time 1 to 2 when the switch 20 is open, the output signal $E_2$ drops to ground potential as there is no capacitor or storage means to keep the output at a high amplitude voltage. The output signal, which is obtained when the input $E_3$ as shown in FIGURE 4 between times 0 and 4 is used, will be a pulsating direct voltage which has an average value that is positive with respect to ground 10. If the input signal $E_3$ is reduced to half amplitude, the resultant output signal will be zero since the time periods such as that between 4 and 5 when switch 20 is closed will give a resultant output signal or voltage of zero. As explained before, no signal will be obtained when the switch 20 is in an open condition. As shown between times 8 and 12 in FIGURE 4, there is no input signal. During this time, the output signal is merely indicative of the half cycle such as between 8 and 9 of the voltage $E_1$. During this half cycle junction point 18 is positive with respect to junction point 12. Since the junction point 18 is connected directly to ground 10 through switch 20 and through the input voltage source supplying the signal $E_3$, the output signal $E_2$ during this time is negative with respect to ground as measured from output terminal 10 to output terminal 12. In the absence of an input signal the output is a pulsating direct voltage which has an average value that is negative with respect to ground.

FIGURE 2 operates substantially the same as previously explained and very similar to the explanation given for FIGURE 1. The signal or input voltage $E_3$ is applied between ground 30 and terminal 68 with the square wave reference voltage or bias voltage being applied between terminals 48 and 46 to turn the transistor 38 from one condition to another and to supply a signal across resistor 62 and thereby provide a bias voltage. During the times from 0 to 4 in FIGURE 4, the output $E_2$ will be a pulsating direct voltage since the voltage appearing across resistor 62 will subtract from the voltage $E_3$ during the ON times of transistor 38. During the times transistor 38 is in an OFF condition, no output signal will be obtained between output terminals 32 and 34. Thus a pulsating direct voltage will be obtained such as shown for signal $E_2$ in FIGURE 4 between times 0 and 4 which has an average positive polarity. When the input signal $E_3$ is half of its maximum value, zero output signal will be obtained as previously explained from FIGURE 1 and during the time when no input signal 83 is provided, the output signal 82 will be a pulsating direct voltage of an average negative polarity. It will be realized that the amplitude of the signal $E_2$ will vary in accordance with the amplitude of the signal $E_3$ between the three possible conditions given for the input signal $E_3$ in FIGURE 4. As mentioned for FIGURE 1, an output signal will be obtained in the absence of an input signal.

The feature such as provided by this invention for a modulator is desirable where the input signal being obtained has a predetermined amplitude under steady state output conditions. The circuit is also useful where an input signal cannot conveniently change in polarity. Using this invention, the modulator will provide an output signal which varies in amplitude and varies in polarity with respect to ground in accordance with changes from a normal or static condition and thereby provides modulation characteristics while the input signal merely changes in amplitude and does not have to change in polarity.

When the circuit is used as a demodulator, an output bias signal will be obtained in the absence of an input signal. It is desirable at times to have an output signal from a demodulator which does not change polarity, but merely changes in amplitude. In prior applications, it has been necessary to sum a direct voltage into the output of the demodulator to provide this bias function. With this demodulator, the bias voltage is obtained during the normal operation of the circuit and additional complicated circuitry is therefore unnecessary.

When the circuit of FIGURE 2 is used as a demodulator or signal converting means, it must be realized that the resistance 66 and the capacitance 70 merely provide one type of a filter means and that in some applications no filtering means at all will be required and in other applications it may be advantageous to use different types of filters. Additionally, the filter utilizing resistor 66 and capacitor mean 70 may be placed between terminal 34 and collector 36 if it is so desired. This is possible as the entire switching circuit is floating with respect to ground. The resistances 52 and 56 are not a necessary part of the circuit in all applications and are merely shown as indicative of the fact that they may be used. It is also to be realized that the transistor 38 may be used in the circuit with the emitter 64 and collector 36 connections reversed. The gain of the transistor 38 may be changed slightly with this connection, but the basic operation will still remain the same. It is also to be realized that the circuit of FIGURE 2 may be changed to provide only negative outputs at terminal 68 with respect to ground, instead of positive, as presently shown. The invention is not limited to a PNP transistor of a so called "symmetrical type" as described in conjunction with this invention. Any type of suitable transistor which provides the proper switching function or any other switching means which will periodically switch a voltage such as $E_1$ in FIGURE 1 into the circuit is within the teaching of this invention.

While I have shown two embodiments of my invention, it is understood that this is for the purpose of illustration only, and that my invention is to be limited solely by the scope of the appended claims.

What I claim is:

1. Demodulating means for providing a direct voltage output signal which varies on either side of an offset voltage with respect to a reference potential in accordance with the amplitude and phase of an alternating input signal comprising in combination:
   - symmetrical transistor means including base, emitter, and collector;
   - reference signal supplying means including first and second output means, said first output means being connected to said base of said transistor means;
   - resistance means connected between said emitter of said transistor means and said second output means of said reference signal supplying means;
   - input signal supplying means having first and second output means, said first output means of said input signal supplying means being connected to said collector means of said transistor means;
   - and filter means including output means, said filter means being connected between said second output means of said input signal supplying means and said second output means of said reference signal supplying means, and said above mentioned means providing an output signal of predetermined magnitude at said output means of said filter means in the absence of the input signal being supplied by said input signal supplying means and providing an output signal which varies from said predetermined magnitude in accordance with amplitude and phase of the input signal.

2. Demodulating means for providing an output signal which varies on either side of a voltage of predetermined magnitude with respect to a reference potential in accordance with at least one characteristic of an input signal comprising in combination:
   - transistor means including base, emitter, and collector;
   - reference signal supplying means including first and second output means, said first output means being connected to said base of said transistor means;
   - impedance means connected between said emitter of said transistor means and said second output means of said reference signal supplying means;
   - input signal supplying means having first and second output means, said first output means of said input signal supplying means being connected to said collector means of said transistor means;
   - and filter means including output means, said filter means being connected between said second output means of said input signal supplying means and said second output means of said reference signal supplying means, and said above mentioned means providing an output signal of said predetermined magnitude at said output means of said filter means in the absence of the input signal being supplied by said input signal supplying means and providing an output signal which varies from said predetermined magnitude in accordance with at least one characteristic of the input signal.

3. Demodulating means for providing a direct voltage output signal which varies on either side of an offset voltage with respect to a reference potential in accordance with the amplitude and phase of an alternating input signal comprising in combination:
   - electric valve means including first, second and third connection means;
   - reference signal supplying means including first and second output means, said first output means being connected to said first connection means of said valve means;

impedance means connected between said second connection means of said valve means and said second output means of said reference signal supplying means;

input signal supplying means having first and second output means, said first output means of said input signal supplying means being connected to said third connection means of said valve means;

and filter means including output means, said filter means being connected between said second output means of said input signal supplying means and said second output means of said reference signal supplying means, and said above mentioned means providing an output signal of predetermined magnitude at said output means of said filter means in the absence of the input signal being supplied by said input signal supplying means and providing an output signal which varies from said predetermined magnitude in accordance with amplitude and phase of the input signal.

4. Signal converting means comprising, in combination:

transistor means including base, emitter and collector;

first impedance means connected at one end to said emitter of said transistor means;

second impedance means connected at one end to said base of said transistor means;

third impedance means connected at one end to the other end of said first impedance means;

transformer means having primary and secondary windings, said secondary winding being connected across the other ends of said second and said third impedance means;

means connected to said primary winding for applying an input thereto, the input to said primary winding generating a voltage to induce current flow through said first impedance means and thereby providing a bias output voltage;

first terminal means connected between a reference potential and said collector of said transistor means;

second terminal means;

and filter means connected to the reference potential, said second terminal means and said other end of said first impedance means.

5. Signal converting means comprising, in combination:

valve means including first, second, and third connection means;

first impedance means for providing a bias signal, said first signal impedance means connected at one end to said first connection means of said valve means;

second impedance means connected at one end to said second connection means of said valve means;

third impedance means connected at one end to the other end of said first impedance means;

transformer means having primary and secondary windings, said secondary winding being connected across the other ends of said second and said third impedance means to generate current flow through said first, second and third impedance means along with said valve means and thereby provide a bias signal across said first impedance means;

means connected to said primary winding for supplying an input thereto;

first terminal means connected between a reference potential and said third connection means of said valve means;

second terminal means;

and filter means connected to the reference potential, said second terminal means and the other end of said first impedance means, said filter means minimizing fluctuations in said bias signal.

6. Signal conversion apparatus comprising, in combination:

valve means operating between two states of conduction at a rate which is a function of a characteristic of a switching signal applied thereto for use as an electric switch;

first means for supplying an input signal;

second means for supplying a switching signal;

third means connecting said second means to said valve means for switching said valve means between the two states of conduction in response to said switching signals;

fourth means for obtaining an output signal;

impedance means connected between said valve means and to said fourth means;

means connecting said first means to said valve means for supplying the input signal thereto; and means connecting second means to said valve means and to said impedance means to provide an output signal indicative of the input signal, an offset output signal being obtained in the absence of an input signal due to a voltage drop appearing across said impedance means from the switching signal current flow therethrough.

7. Signal converting apparatus comprising, in combination:

first signal supplying means for supplying a first signal;

reference potential means;

second signal supplying means for supplying a second signal;

signal responsive switching means operable to change from a first condition to a second condition at a rate which is in a function of a characteristic of one of said signals;

output means;

means connecting said first signal supplying means, said second signal supplying means and said switching means in series relationship between said reference potential and said output means to obtain an output signal which varies in accordance with said first signal and provides a bias signal indicative of said second signal in the absence of said first signal;

and capacitive means connected between said reference potential and said output means.

References Cited by the Examiner

UNITED STATES PATENTS

| | | | |
|---|---|---|---|
| 2,987,627 | 6/1961 | Eckert | 307—88.5 |
| 3,003,122 | 10/1961 | Gerhard | 332—9 |
| 3,021,431 | 2/1962 | Wellman | 307—88.5 |

FOREIGN PATENTS

| | | |
|---|---|---|
| 861,263 | 2/1961 | Great Britain. |

ROY LAKE, *Primary Examiner.*

ALFRED L. BRODY, *Examiner.*